US012342446B2

(12) United States Patent
Tsukamoto

(10) Patent No.: US 12,342,446 B2
(45) Date of Patent: Jun. 24, 2025

(54) X-RAY GENERATION APPARATUS AND X-RAY IMAGING APPARATUS

(71) Applicant: CANON ANELVA CORPORATION, Kawasaki (JP)

(72) Inventor: Takeo Tsukamoto, Niigata (JP)

(73) Assignee: Canon Anelva Corporation, Kawasaki (JP)

( * ) Notice: Subject to any disclaimer, the term of this patent is extended or adjusted under 35 U.S.C. 154(b) by 0 days.

(21) Appl. No.: 18/974,437

(22) Filed: Dec. 9, 2024

(65) Prior Publication Data

US 2025/0106971 A1 Mar. 27, 2025

Related U.S. Application Data

(63) Continuation of application No. PCT/JP2023/002275, filed on Jan. 25, 2023.

(51) Int. Cl.
*H05G 1/04* (2006.01)

(52) U.S. Cl.
CPC .................................... *H05G 1/04* (2013.01)

(58) Field of Classification Search
CPC ........ H01J 35/116; H01J 35/186; H01J 35/18; H01J 35/16; H01J 35/06; H01J 2235/18; H05G 1/04
See application file for complete search history.

(56) References Cited

U.S. PATENT DOCUMENTS 5,132,999 A 7/1992 Wirth
9,131,590 B2 9/2015 Suzuki et al.
(Continued)

FOREIGN PATENT DOCUMENTS

JP H0287500 A 3/1990
JP H04319296 A 11/1992
(Continued)

OTHER PUBLICATIONS

International Search Report (PCT/ISA/210) with translation and Written Opinion (PCT/ISA/237) mailed Mar. 7, 2023, by the Japan Patent Office as the International Searching Authority for International Application No. PCT/JP2023/002275. (10 pages).
(Continued)

*Primary Examiner* — David J Makiya
*Assistant Examiner* — Soorena Kefayati
(74) *Attorney, Agent, or Firm* — Buchanan Ingersoll & Rooney PC

(57) ABSTRACT

An X-ray generation apparatus includes an X-ray generation tube. The tube includes an insulating tube with a first opening end and a second opening end, a cathode arranged to close the first opening end of the insulating tube and including an electron emitting portion, and an anode arranged to close the second opening end and including a target that generates X-rays when electrons from the electron emitting portion collide; and an accommodating container configured to accommodate the X-ray generation tube, wherein the accommodating container has a third opening end, and the anode is arranged to close the third opening end, the accommodating container is filled with an insulating liquid to contact a part of the anode, and at least a part of an outer surface of the insulating tube is surrounded by a member so as to reduce abnormal discharge between the cathode and the anode via the insulating tube.

13 Claims, 8 Drawing Sheets

(56) References Cited

U.S. PATENT DOCUMENTS

| | | | | |
|---|---|---|---|---|
| 9,230,774 | B2 | 1/2016 | Yanagisawa et al. | |
| 9,282,622 | B2 | 3/2016 | Draper et al. | |
| 9,373,478 | B2 * | 6/2016 | Tamura | H01J 35/13 |
| 9,653,252 | B2 | 5/2017 | Yanagisawa et al. | |
| 9,741,524 | B2 | 8/2017 | Kawase | |
| 9,818,571 | B2 | 11/2017 | Shiozawa et al. | |
| 9,824,848 | B2 | 11/2017 | Ikarashi | |
| 9,831,060 | B2 | 11/2017 | Kawase | |
| 9,887,063 | B2 | 2/2018 | Yamazaki et al. | |
| 10,381,190 | B2 | 8/2019 | Ikarashi | |
| 10,504,679 | B2 | 12/2019 | Ohashi | |
| 10,720,299 | B1 | 7/2020 | Ando | |
| 10,743,396 | B1 | 8/2020 | Kawase | |
| 10,813,203 | B2 | 10/2020 | Kawase et al. | |
| 10,969,347 | B2 | 4/2021 | Kawase | |
| 11,039,526 | B2 | 6/2021 | Suzuki et al. | |
| 11,140,763 | B2 | 10/2021 | Kawase | |
| 11,875,965 | B2 | 1/2024 | Ishii | |
| 2013/0266119 | A1 * | 10/2013 | Taniguchi | H01J 35/14 378/111 |
| 2014/0029725 | A1 * | 1/2014 | Ueda | A61B 6/4488 378/62 |
| 2014/0369467 | A1 * | 12/2014 | Yamazaki | H01J 9/26 156/287 |
| 2016/0020060 | A1 * | 1/2016 | Ohashi | H01J 35/025 378/111 |
| 2016/0133429 | A1 * | 5/2016 | Kawase | H01J 35/186 378/124 |
| 2016/0163499 | A1 * | 6/2016 | Shimono | H01J 35/18 378/140 |
| 2016/0225572 | A1 * | 8/2016 | Yanagisawa | H01J 35/116 |
| 2017/0032923 | A1 * | 2/2017 | Tsunoda | H01J 35/18 |
| 2019/0150255 | A1 * | 5/2019 | Kawase | H01J 35/16 378/111 |
| 2020/0211808 | A1 * | 7/2020 | Ando | H01J 35/32 |
| 2021/0100088 | A1 * | 4/2021 | Ishii | H05G 1/06 |
| 2024/0306283 | A1 | 9/2024 | Kawase et al. | |

FOREIGN PATENT DOCUMENTS

| | | | |
|---|---|---|---|
| JP | 2007080568 | A | 3/2007 |
| JP | 2011233411 | A | 11/2011 |
| JP | 2013101879 | A | 5/2013 |
| JP | 2014072158 | A | 4/2014 |
| JP | 2014086147 | A | 5/2014 |
| JP | 2014139876 | A | 7/2014 |
| JP | 2014154423 | A | 8/2014 |
| JP | 2015015227 | A | 1/2015 |
| JP | 2015028909 | A | 2/2015 |
| JP | 2015153548 | A | 8/2015 |
| JP | 2016085945 | A | 5/2016 |
| JP | 2016095916 | A | 5/2016 |
| JP | 2016103451 | A | 6/2016 |
| JP | 2016539484 | A | 12/2016 |
| JP | 2017016921 | A | 1/2017 |
| JP | 2017022037 | A | 1/2017 |
| JP | 2018026355 | A | 2/2018 |
| JP | 2018073625 | A | 5/2018 |
| JP | 2018206676 | A | 12/2018 |
| JP | 2018206677 | A | 12/2018 |
| JP | 7413614 | B1 | 1/2024 |
| JP | 7486694 | B1 | 5/2024 |
| WO | 2020136911 | A1 | 7/2020 |
| WO | 2020213039 | A1 | 10/2020 |
| WO | 2021015036 | A1 | 1/2021 |
| WO | 2021022428 | A1 | 2/2021 |
| WO | 2021044524 | A1 | 3/2021 |
| WO | 2021044525 | A1 | 3/2021 |
| WO | 2024157394 | A1 | 8/2024 |
| WO | 2024157530 | A1 | 8/2024 |

OTHER PUBLICATIONS

IPRP mailed Jun. 7, 2023, by the Japan Patent Office for International Application No. PCT/JP2023/002275. (18 pages).

* cited by examiner

X-RAY GENERATION APPARATUS AND X-RAY IMAGING APPARATUS

CROSS-REFERENCE TO RELATED APPLICATIONS

This application is a Continuation of International Patent Application No. PCT/JP2023/002275, filed Jan. 25, 2023, which is hereby incorporated by reference herein in its entirety.

BACKGROUND OF THE INVENTION

Field of the Invention

The present invention relates to an X-ray generation apparatus and an X-ray imaging apparatus.

Background Art

PTL 1 describes an X-ray generation tube, a tube driving circuit that drives the X-ray generation tube, and an X-ray generation apparatus including an accommodating container that accommodates the X-ray generation tube and the tube driving circuit. The accommodating container is filled with an insulating liquid, and the insulating liquid ensures insulating performance between the X-ray generation tube and the tube driving circuit.

CITATION LIST

Patent Literature

PTL 1: Japanese Patent Laid-Open No. 2016-103451.

SUMMARY OF INVENTION

When an X-ray generation apparatus is used for a long period, abnormal discharge sometimes occurs in an X-ray generation tube. It has been found by studies of the present inventor that abnormal discharge occurs between the cathode and anode of the X-ray generation tube via the outer surface of an insulating tube. The abnormal discharge may cause the X-ray generation apparatus to stop or fail.

One aspect of the present invention provides a technique advantageous in suppressing the occurrence of abnormal discharge in an X-ray generation apparatus.

One aspect of the present invention provides an X-ray generation apparatus comprising: an X-ray generation tube including an insulating tube with a first opening end and a second opening end, a cathode arranged to close the first opening end of the insulating tube and including an electron emitting portion, and an anode arranged to close the second opening end and including a target that generates X-rays when electrons from the electron emitting portion collide; and an accommodating container configured to accommodate the X-ray generation tube, wherein the accommodating container has a third opening end, and the anode is arranged to close the third opening end, the accommodating container is filled with an insulating liquid to contact a part of the anode, and at least a part of an outer surface of the insulating tube is surrounded by a member so as to reduce abnormal discharge between the cathode and the anode via the insulating tube.

DESCRIPTION OF EMBODIMENTS

Figure 1:
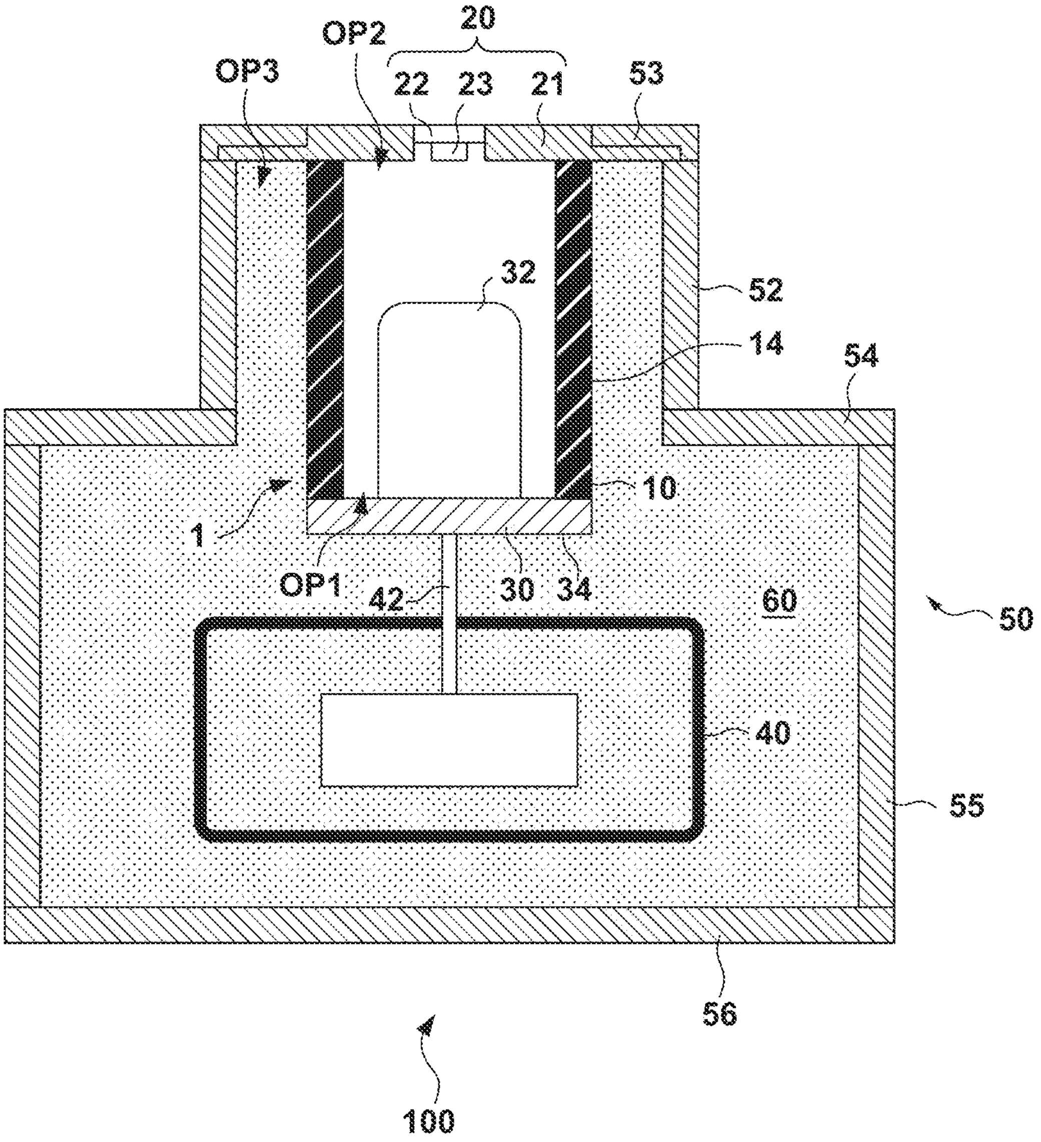
FIG. 1 is a view for explaining the basic arrangement of an X-ray generation apparatus according to the present disclosure.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

The basic arrangement of an X-ray generation apparatus 100 according to the present disclosure will be described first with reference to FIG. 1. The X-ray generation apparatus 100 can include an X-ray generation tube 1 and an accommodating container 50 that accommodates the X-ray generation tube 1. The X-ray generation apparatus 100 may further include a driving circuit 40 that drives the X-ray generation tube 1, and the driving circuit 40 is accommodated in the accommodating container 50 and can be connected to the X-ray generation tube 1 via a cable 42. A part (an anode 20 to be described later) of the X-ray generation tube 1 can be exposed to the external space of the accommodating container 50 (the external space of the X-ray generation apparatus 100). The internal space of the accommodating container 50 is filled with an insulating liquid 60. From another viewpoint, the internal space of the accommodating container 50 is filled with the insulating liquid 60 except for a space occupied by components (the X-ray generation tube 1, the cable 42, and the like) accommodated in the accommodating container 50. The insulating liquid 60 can be, for example, an insulating oil such as a mineral oil or a chemical synthetic oil. Alternatively, the insulating liquid 60 may be a liquid other than an insulating oil, for example, a fluorine-based inert liquid (for example, Fluorinert™).

The X-ray generation tube 1 can include an insulating tube 10, a cathode 30, and the anode 20. A vacuum is maintained in the internal space of the X-ray generation tube 1. The insulating tube 10 can include a first opening end OP1 and a second opening end OP2. The insulating tube 10 can have a tubular shape such as a cylindrical shape. The insulating tube 10 can be configured to provide vacuum airtightness and insulating properties of the internal space of the insulating tube 10. The insulating tube 10 can be made of, for example, a ceramic material mainly containing alumina or zirconia. Alternatively, the insulating tube 10 can be made of a glass material such as borosilicate glass.

The cathode 30 can be arranged to close the first opening end OP1 of the insulating tube 10. The cathode 30 includes an electron emitting portion 32. The anode 20 can be arranged to close the second opening end OP2 of the insulating tube 10. The anode 20 can include a target 23 that generates X-rays when electrons from the electron emitting portion 32 collide therewith. The anode 20 can include a target holding plate 22 that holds the target 23, and an electrode 21 that supports the target holding plate 22. The electrode 21 is formed by a conductor, and is electrically connected to the target 23 to apply a potential to the target 23. The anode 20 can be maintained at, for example, the ground potential but may be maintained at another potential. The target 23 can be made of a material having a high melting point and high generation efficiency of X-rays, such as tungsten, tantalum, or molybdenum. The target holding plate 22 can be made of, for example, a material that can easily transmit X-rays, such as beryllium or diamond.

The accommodating container 50 can have a third opening end OP3. The accommodating container 50 can include, for example, a first portion 52, a second portion 53, a third portion 54, a fourth portion 55, and a fifth portion 56. The first portion 52 can have a tubular shape such as a cylindrical shape. The first portion 52 can define the third opening end OP3 of the accommodating container 50. In other words, the first portion 52 can include the third opening end OP3. The second portion 53 is formed by a conductor, and is electrically connected to the anode 20 of the X-ray generation tube 1. It may be understood that the second portion 53 forms the anode together with the electrode 21. The second portion 53 can have a ring shape or a frame shape. The second portion 53 can be arranged to contact the insulating liquid 60. Alternatively, a conductive member including the electrode 21 and the second portion 53 can be arranged to contact the insulating liquid 60. The electrode 21 and the second portion 53 may be formed as a single piece of the same material. The fourth portion 55 can have a tubular shape such as a cylindrical shape or a rectangular tubular shape. The third portion 54 is connected to one end of the fourth portion 55, and can have a ring shape or a frame shape. The first portion 52 can be connected to the third portion 54 to project from the third portion 54. The fifth portion can be connected to the other end of the fourth portion. Alternatively, the third portion 54, the fourth portion 55, and the fifth portion 56 may be integrated to form a hollow spherical shape (except for the joint portion with the first portion 52).

Figure 7:
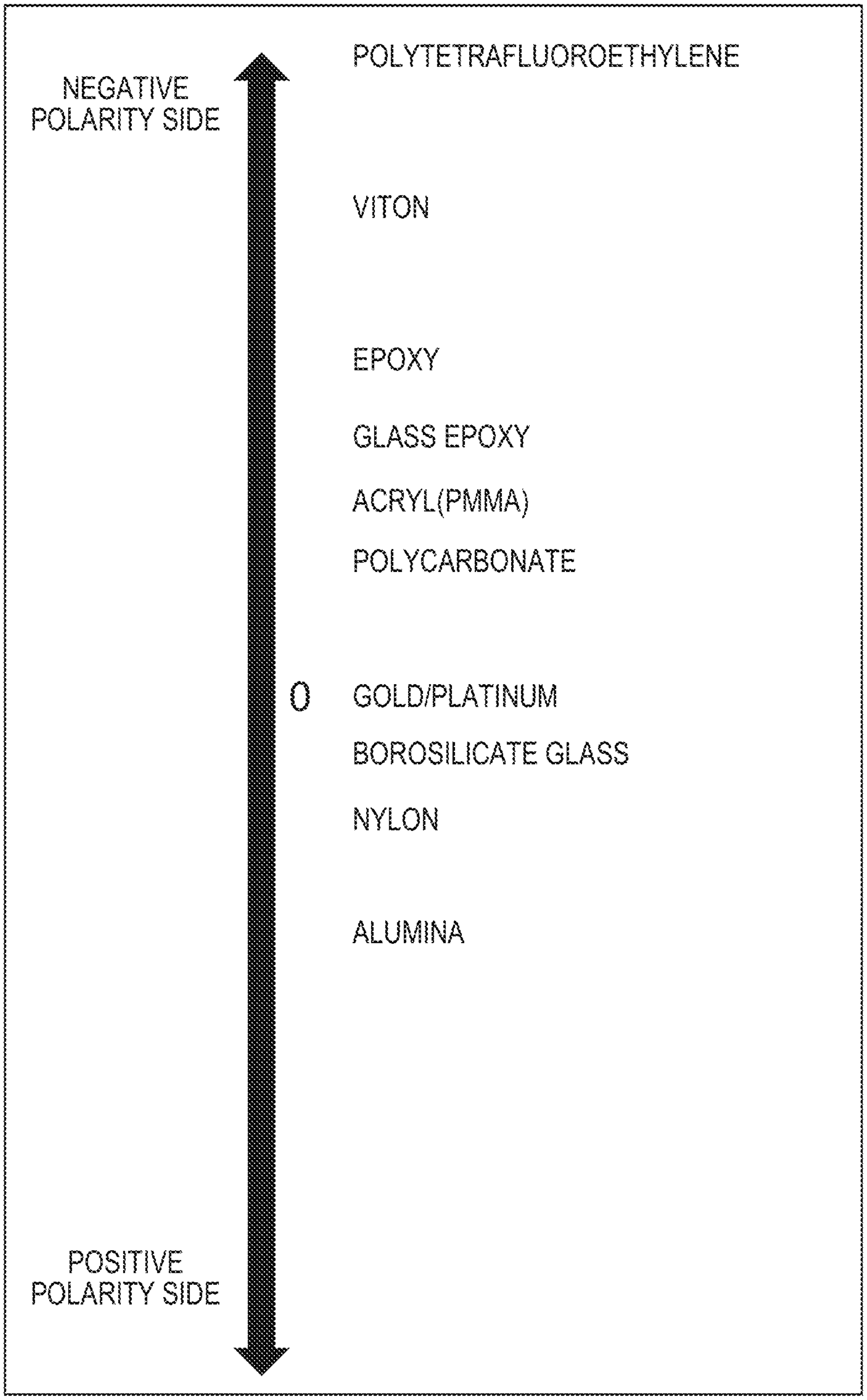
FIG. 7 is a view exemplifying a triboelectric series in triboelectrification with an insulating liquid.

The insulating liquid 60 can cause convection in the internal space of the accommodating container 50. When an entire outer surface 14 of the insulating tube 10 contacts the insulating liquid 60, the insulating tube 10 and the insulating liquid 60 can be charged by friction between the insulating liquid 60 and the outer surface 14 of the insulating tube 10. This charging is called triboelectrification. In general, triboelectrification indicates a phenomenon that friction between two different types of materials causes charges to move between the two types of materials, and thus one of the material is charged to positive polarity and the other material is charged to negative polarity. The present inventor performed an experiment of measuring the potential of the outer surface of the insulating tube by a surface electrometer after leaving the insulating tube in a convecting insulating oil (insulating liquid). As a result, it was confirmed that the outer surface of the insulating tube was charged to positive polarity and the amount of charge increased in proportion to the time. Charging polarity by friction depends on the characteristics of materials that are rubbed together. Examples of the characteristics of the materials are a triboelectric series and relative permittivity. FIG. 7 shows an example of a triboelectric series with respect to an insulating oil. The triboelectric series indicates positive polarity or negative polarity to which the rubbed material is charged and the ordering of easiness of charging. In the triboelectric series, a material located on the positive polarity side is readily charged to positive polarity and a material located on the negative polarity side is readily charged to negative polarity.

Figure 6:
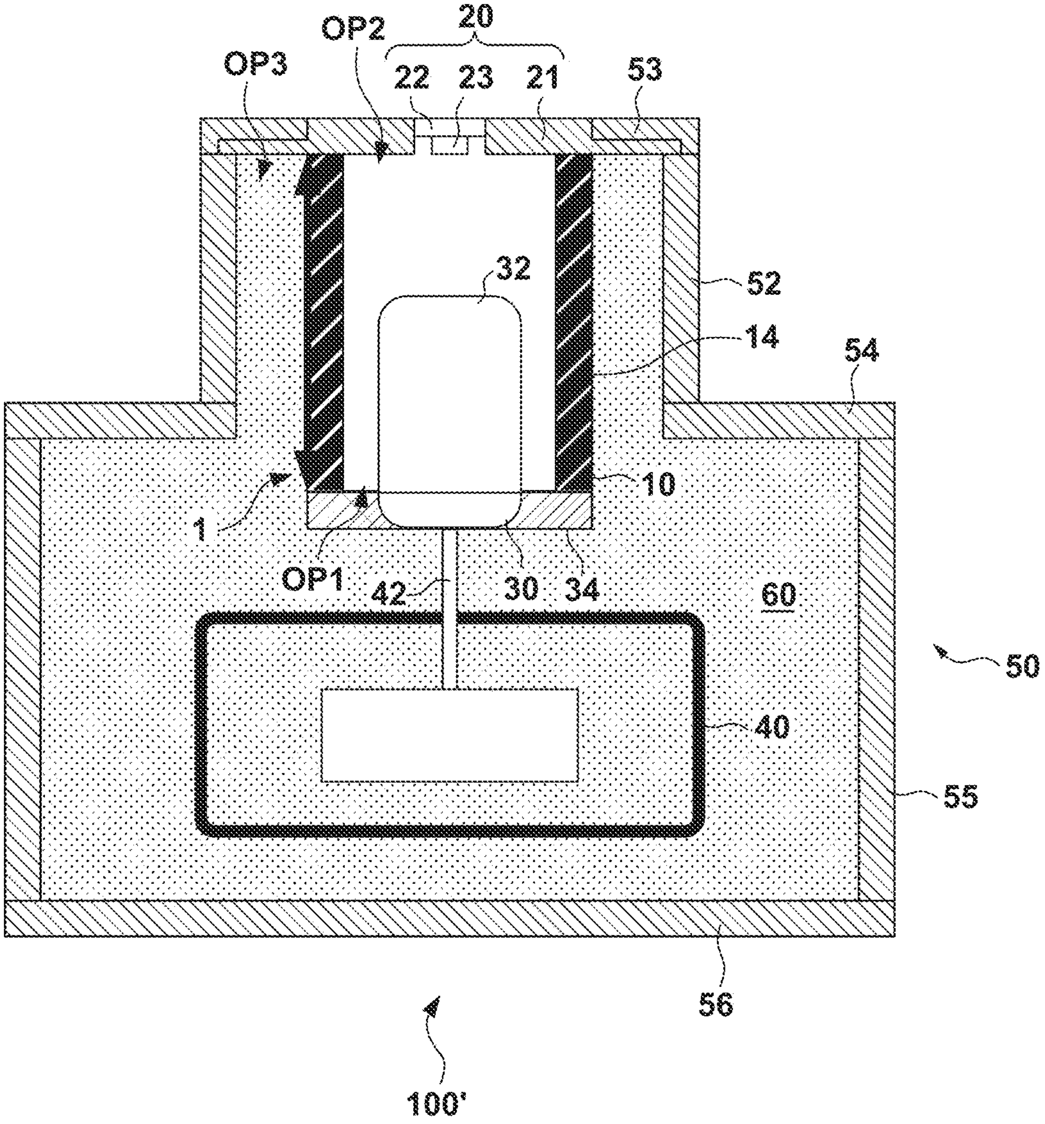
FIG. 6 is a view schematically showing the occurrence of abnormal discharge.

When the outer surface 14 of the insulating tube 10 is charged to positive polarity, the insulating performance between the cathode 30 and the anode 20 may lower. The insulating performance between the cathode 30 and the anode 20 may depend on a potential difference between the cathode 30 and the anode 20, resistance between the cathode 30 and the anode 20, a distance between the cathode 30 and the anode 20, and the like. As a result of the experiment, it was found that when the insulating tube 10 was charged to positive polarity, the cathode 30 and the anode 20 were short-circuited via the outer surface 14 of the insulating tube 10, as schematically indicated by a thick arrow in FIG. 6. In addition, as a result of the experiment, it was found that when the outer surface 14 of the insulating tube 10, the cathode 30, and the insulating liquid 60 formed a triple point, abnormal discharge readily occurred due to an electron avalanche.

The X-ray generation apparatus 100 of the present disclosure will exemplarily be described below through a plurality of embodiments shown in FIGS. 2, 3, 4, and 5. Matters not to be mentioned below can comply with the basic arrangement described with reference to FIG. 1.

Figure 2:
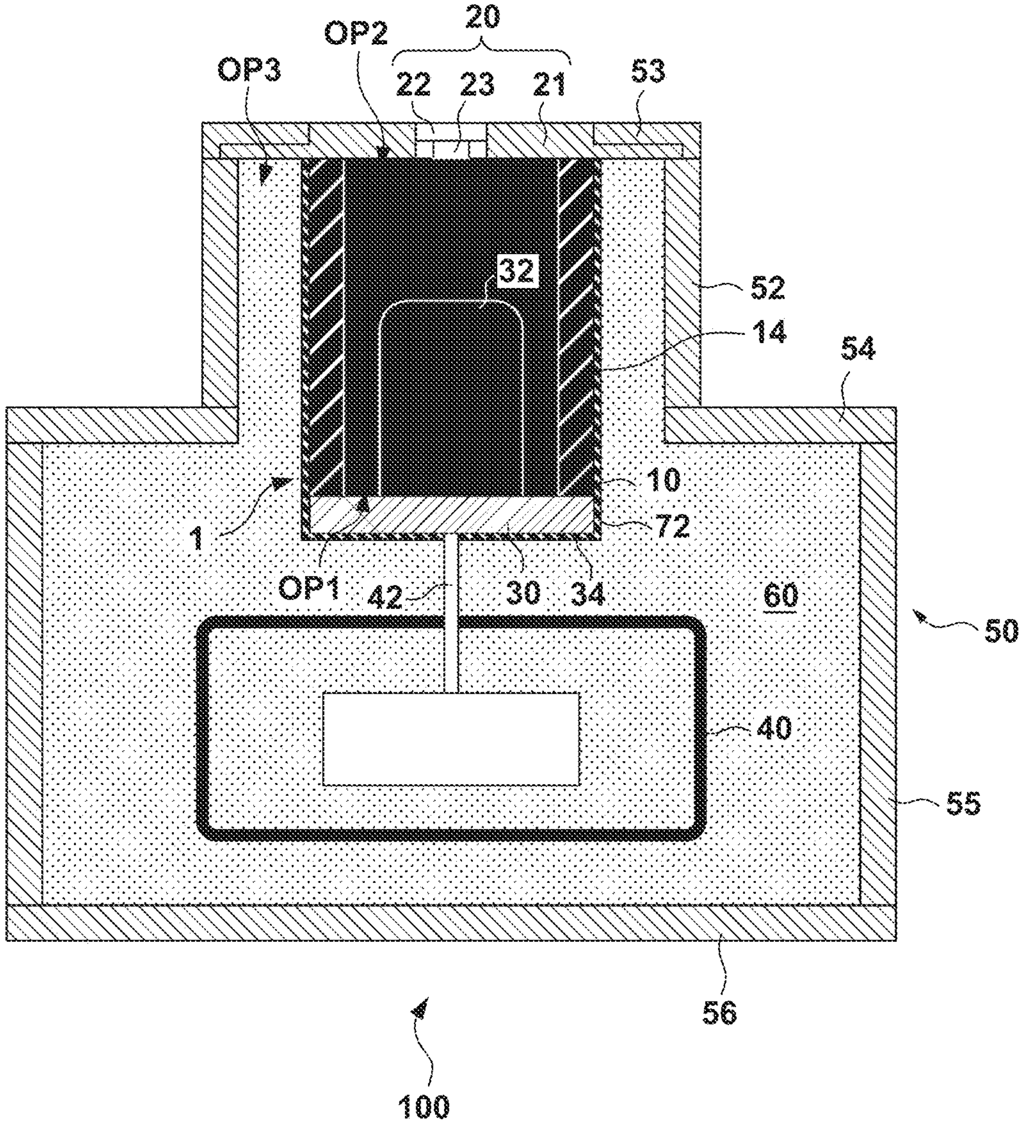
FIG. 2 is a view exemplarily and schematically showing the arrangement of an X-ray generation apparatus according to the first embodiment.

FIG. 2 exemplarily and schematically shows the arrangement of an X-ray generation apparatus 100 according to the first embodiment. An accommodating container 50 can be filled with an insulating liquid 60 to contact a part (for example, a second portion 53) of an anode and cover an outer surface 14 of an insulating tube 10 and an outer surface 34 of a cathode 30. In the X-ray generation apparatus 100 of the first embodiment, at least a part of the insulating tube 10 is surrounded by a member 72 so as to reduce abnormal discharge between the cathode 30 and an anode 20 via the insulating tube 10. The member 72 can be made of an insulating material. More specifically, in the X-ray generation apparatus 100 of the first embodiment, the entire region of the outer surface 14 of the insulating tube 10 can be surrounded by the member 72. From another viewpoint, the entire region of the outer surface 14 of the insulating tube 10 can be covered with the member 72. In addition to the entire region of the outer surface 14 of the insulating tube 10, the entire region of the outer surface 34 of the cathode 30 can be covered with the member 72. The first embodiment is effective in avoiding the outer surface 14 of the insulating tube 10, the cathode 30, and the insulating liquid 60 from forming a triple point, thereby making it possible to reduce the occurrence of abnormal discharge.

To reduce abnormal discharge between the cathode 30 and the anode 20 via the insulating tube 10, the material of the member 72 is decided so that triboelectrification between the member 72 and the insulating liquid 60 causes the member 72 to be charged to negative polarity and the insulating liquid 60 to be charged to positive polarity. In a case where an insulating oil is adopted as the insulating liquid 60, for example, the material of the member 72 can be selected so that triboelectrification between the member 72 and the insulating oil causes the member 72 to be charged to negative polarity in accordance with the triboelectric series exemplified in FIG. 7. As the material of the member 72, for example, polytetrafluoroethylene (Teflon™), PMMA (polymethyl methacrylate resin), epoxy, and fluorine rubber (for example, Viton™) are preferable. The member 72 is arranged to cover the entire region of the outer surface 14 of the insulating tube 10 and the entire region of the outer surface 34 of the cathode 30, and for example, a mold method, a spray method, a dip method, or the like can thus be applied.

To reduce abnormal discharge between the cathode 30 and the anode 20 via the insulating tube 10, the material of the member 72 can be decided so that a difference in relative permittivity between the member 72 and the insulating liquid 60 is smaller than a difference in relative permittivity between the member 72 and the insulating tube 10. For example, the member 72 is made of Viton having relative permittivity of 3 or polytetrafluoroethylene having relative permittivity of 2.1, and the insulating tube 10 is made of borosilicate glass having relative permittivity of 4.9 or alumina having relative permittivity of 9. The fact that a difference in relative permittivity between the member 72 and the insulating liquid 60 is smaller than a difference in relative permittivity between the member 72 and the insulating tube 10 may be evaluated at a temperature when generating X-rays or at room temperature (for example, 25°). However, there is no large difference between the former case and the latter case.

A mold method preferable to form the member 72 so as to cover an X-ray generation tube 1 (the outer surface 14 of the insulating tube 10 and the outer surface 34 of the cathode 30) will now be described. The material of the member 72, that is, the covering material is obtained by kneading a principal agent and a curing assistant in advance by a kneading device so as not to contain bubbles, and can be held at a constant temperature to maintain an appropriate flow. In a case of an epoxy-based resin, the temperature is, for example, about 100° C. but the temperature can appropriately be decided in accordance with the material to be used. The covering material can be poured into a container having a size larger than the X-ray generation tube 1 to be covered. At this time, the covering material can be cooled rapidly due to the temperature difference between the container and the covering material, thereby degrading liquidity of the covering material. To prevent this, the container is desirably heated in advance. After the covering material poured into the container is caused to overflow from the container, the covering material can be solidified at an appropriate cooling rate and temperature distribution not to cause a problem such as shrinkage.

In the X-ray generation tube 1, a high voltage is applied between the anode 20 and the cathode 30. Therefore, if a bubble having a small dielectric constant exists in the member 72 made of the covering material, the electric field is concentrated on the bubble, thereby inducing abnormal discharge. To avoid this, a space where processing of filling the covering material is performed can be exhausted in advance using a vacuum pump to obtain a vacuum degree of about several hundred to several thousand Pa. Furthermore, to improve adhesion between the covering material and the X-ray generation tube 1, the X-ray generation tube 1 may be covered with the member 72 after applying a primer material to the surface of the X-ray generation tube 1 or forming unevenness by blast processing. The thickness of the member 72 is desirably small from a viewpoint of heat dissipation of the X-ray generation tube 1. For example, the thickness of the member 72 is preferably 5 mm or less, and more preferably 3 mm or less. For example, the thickness of the member 72 is preferably 0.3 mm or more, and more preferably 0.5 mm or more.

Figure 3:
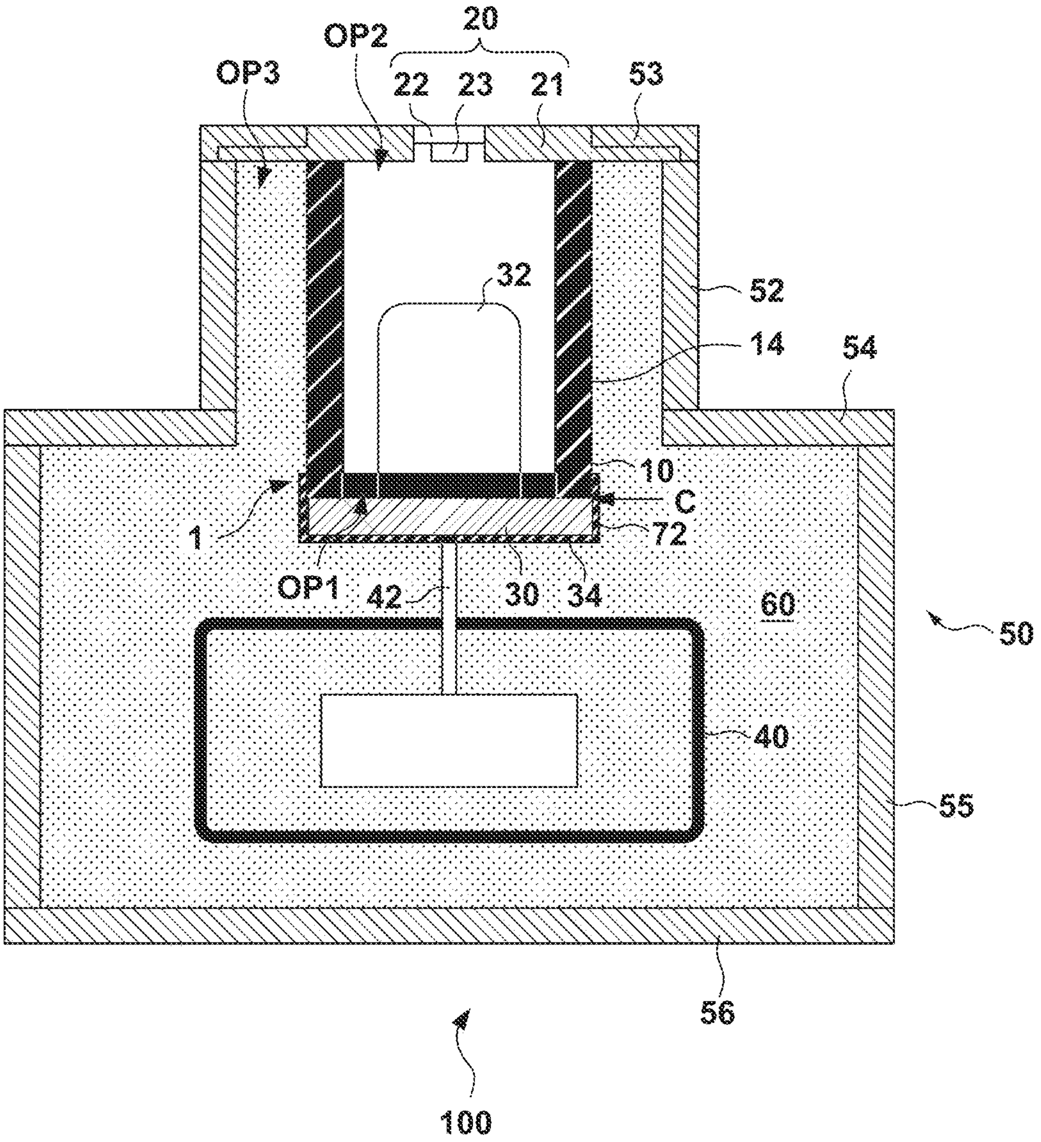
FIG. 3 is a view exemplarily and schematically showing the arrangement of an X-ray generation apparatus according to the second embodiment.

FIG. 3 exemplarily and schematically shows the arrangement of an X-ray generation apparatus 100 according to the second embodiment. Matters not mentioned as the second embodiment can comply with the first embodiment or the basic arrangement described with reference to FIG. 1. A member 72 can be arranged to cover a contact portion C between a cathode 30 and an insulating tube 10. Furthermore, the member 72 can be arranged to cover the cathode 30. The second embodiment is also effective in avoiding an outer surface 14 of the insulating tube 10, the cathode 30, and an insulating liquid 60 from forming a triple point, thereby making it possible to reduce the occurrence of abnormal discharge.

Figure 4:
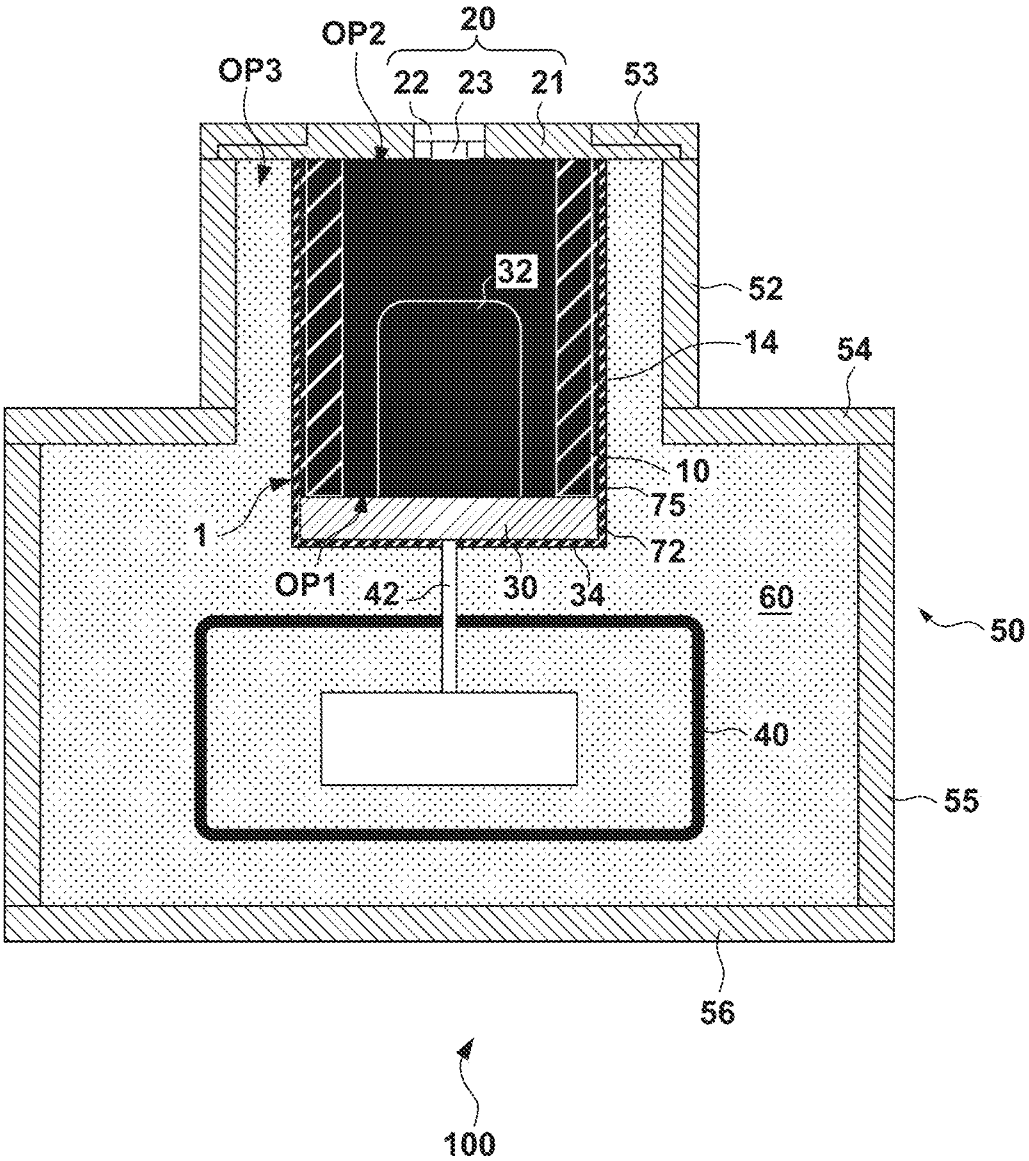
FIG. 4 is a view exemplarily and schematically showing the arrangement of an X-ray generation apparatus according to the third embodiment.

FIG. 4 exemplarily and schematically shows the arrangement of an X-ray generation apparatus 100 according to the third embodiment. Matters not mentioned as the third embodiment can comply with the first or second embodiment or the basic arrangement described with reference to FIG. 1. In the third embodiment, an intermediate layer 75 is provided between a member 72 and an insulating tube 10. The intermediate layer 75 can be made of an insulating material. The intermediate layer 75 can be configured to cover the insulating tube 10. The member 72 can be configured to cover the intermediate layer 75. The intermediate layer 75 can be made of at least one of, for example, Kovar glass, nylon, and a mixture containing a metal oxide that contains silica as a main component. Providing the intermediate layer 75 is advantageous in, for example, forming a smooth surface to cover an outer surface 14 of the insulating tube 10. Forming the intermediate layer 75 is advantageous in suppressing a foreign substance from entering between particles forming the insulating tube 10. As a result, it is possible to improve a creepage withstand voltage on the surface of the member 72 arranged to cover the insulating tube 10. This can prevent abnormal discharge, thereby increasing the life of the X-ray generation apparatus 100.

Figure 5:
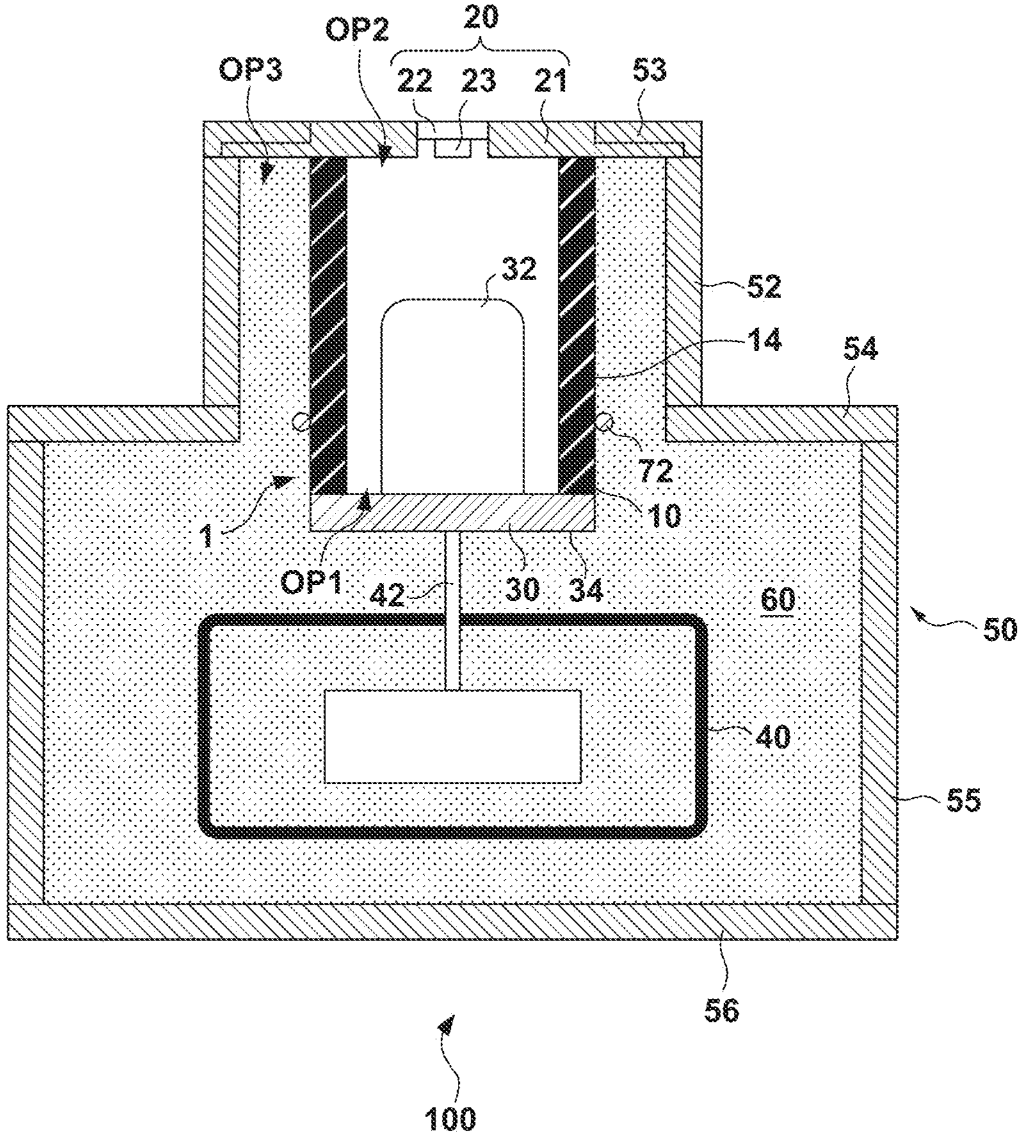
FIG. 5 is a view exemplarily and schematically showing the arrangement of an X-ray generation apparatus according to the fourth embodiment.

FIG. 5 exemplarily and schematically shows the arrangement of an X-ray generation apparatus 100 according to the fourth embodiment. Matters not mentioned as the fourth embodiment can comply with the first to third embodiments or the basic arrangement described with reference to FIG. 1. In the third embodiment, a member 72 can include a ring-shaped portion. Alternatively, the member 72 can be a ring-shaped portion. The ring-shaped portion can surround the whole circumference of a part in the axial direction (that is the axial direction of the insulating tube 10 and is also a direction in which an electron beam is emitted from an electron emitting portion 32) of an outer surface 14 of an insulating tube 10. The outer surface 14 of the insulating tube 10 can contact an insulating liquid 60 in a region other than the region surrounded by the member 72. The shortest distance between the member 72 and a cathode 30 is preferably smaller than the shortest distance between the member 72 and an anode 20. The insulating tube 10 may be surrounded by a plurality of members 72 (ring-shaped portions). The plurality of members 72 can be arranged apart from each other with respect to the axial direction of the insulating tube 10. The member 72 can be formed by, for example, Viton. Even if the outer surface 14 of the insulating tube 10 is charged to positive polarity, the amount of charge to positive polarity on the entire outer surface 14 of the insulating tube 10 can be reduced when the member 72 is charged to negative polarity. This can reduce the occurrence of abnormal discharge.

Figure 8:
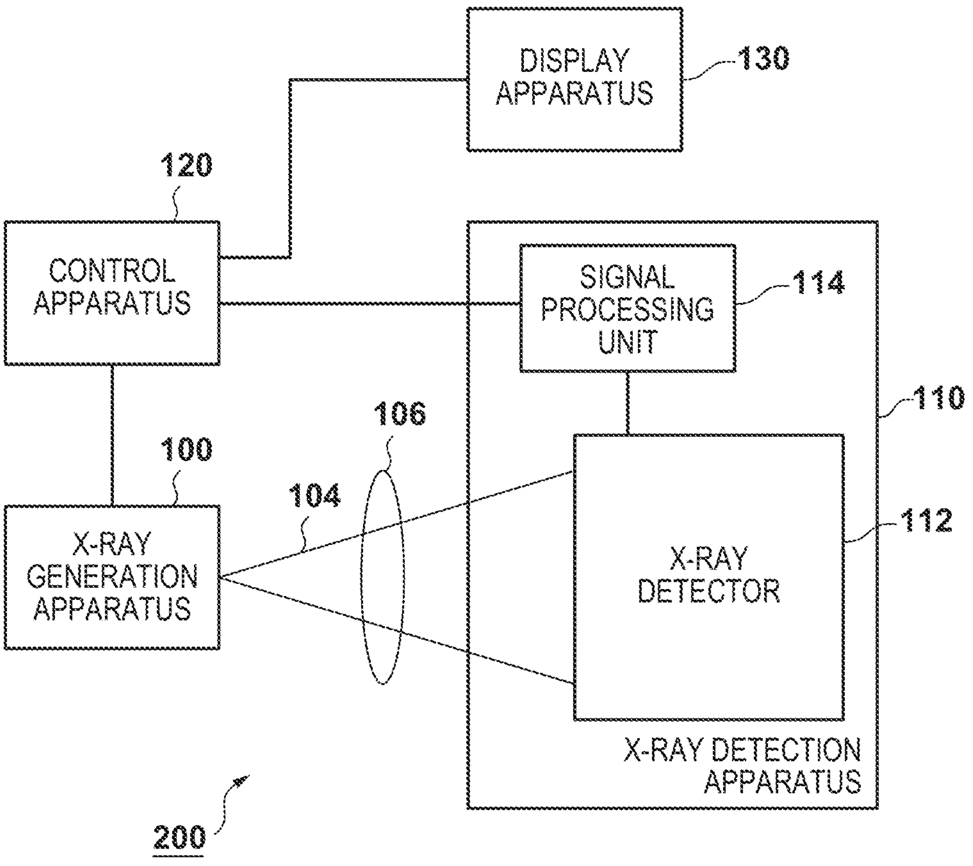
FIG. 8 is a block diagram showing the arrangement of an X-ray imaging apparatus according to an embodiment.

FIG. 8 shows the arrangement of an X-ray imaging apparatus 200 according to an embodiment. The X-ray imaging apparatus 200 can include an X-ray generation apparatus 100, and an X-ray detection apparatus 110 that detects X-rays 104 emitted from the X-ray generation apparatus 100 and transmitted through an object 106. The X-ray imaging apparatus 200 may further include a control apparatus 120 and a display apparatus 130. The X-ray detection apparatus 110 can include an X-ray detector 112 and a signal processing unit 114. The control apparatus 120 can control the X-ray generation apparatus 100 and the X-ray detection apparatus 110. The X-ray detector 112 detects or images the X-rays 104 emitted from the X-ray generation apparatus 100 and transmitted through the object 106. The signal processing unit 114 can process a signal output from the X-ray detector 112, and supply the processed signal to the control apparatus 120. The control apparatus 120 displays an image on the display apparatus 130 based on the signal supplied from the signal processing unit 114.

The present invention is not limited to the above embodiments and various changes and modifications can be made within the spirit and scope of the present invention. Therefore, to apprise the public of the scope of the present invention, the following claims are made.

The invention claimed is:

1. An X-ray generation apparatus comprising:

an X-ray generation tube including an insulating tube with a first opening end and a second opening end, a cathode arranged to close the first opening end of the insulating tube and including an electron emitting portion, and an anode arranged to close the second opening end and including a target that generates X-rays when electrons from the electron emitting portion collide; and an accommodating container configured to accommodate the X-ray generation tube, wherein the accommodating container has a third opening end, and the anode is arranged to close the third opening end, wherein the accommodating container is filled with an insulating liquid to contact a part of the anode, and wherein an entire region of an outer surface of the insulating tube and an entire region of the cathode are surrounded by a member so as to reduce abnormal discharge between the cathode and the anode via the insulating tube.

2. The X-ray generation apparatus according to claim 1, wherein the member is formed by a mold method.

3. The X-ray generation apparatus according to claim 1, wherein the accommodating container includes a portion having a tubular shape, the portion of the accommodating container has a third opening end closed by the anode, a part of the X-ray generation tube is surrounded by the portion of the accommodating container.

4. The X-ray generation apparatus according to claim 1, wherein the member is made of an insulating material.

5. The X-ray generation apparatus according to claim 1, wherein the member is made of one of polytetrafluoroethylene, PMMA (polymethyl methacrylate resin), and fluorine rubber.

6. The X-ray generation apparatus according to claim 1, wherein—the member is made of epoxy.

7. The X-ray generation apparatus according to claim 1, wherein the insulating liquid is an insulating oil.

8. The X-ray generation apparatus according to claim 1, wherein the insulating liquid is a fluorine-based inert liquid.

9. An X-ray imaging apparatus comprising:

the X-ray generation apparatus defined in claim 1; and an X-ray detector configured to detect X-rays emitted from the X-ray generation apparatus.

10. An X-ray generation apparatus comprising:

an X-ray generation tube including an insulating tube with a first opening end and a second opening end, a cathode arranged to close the first opening end of the insulating tube and including an electron emitting portion, and an anode arranged to close the second opening end and including a target that generates X-rays when electrons from the electron emitting portion collide; and an accommodating container configured to accommodate the X-ray generation tube, wherein the accommodating container has a third opening end, and the anode is arranged to close the third opening end, wherein the accommodating container is filled with an insulating liquid to contact a part of the anode, wherein a part of an outer surface of the insulating tube is surrounded by a member so as to reduce abnormal discharge between the cathode and the anode via the insulating tube, wherein the member is arranged apart from the first opening end and the second opening end in an axial direction of the insulating tube, and wherein a distance between the member and the cathode is smaller in the axial direction than a distance between the member and the anode in the axial direction.

11. The X-ray generation apparatus according to claim 10, wherein the member includes a ring-shaped portion.

12. The X-ray generation apparatus according to claim 11, wherein a plurality of the members are arranged apart from each other with respect to an axial direction of the insulating tube.

13. The X-ray generation apparatus according to claim 11, wherein the ring-shaped portion has a circular cross section.

* * * * *